US012339896B2

United States Patent
Barros et al.

(10) Patent No.: US 12,339,896 B2
(45) Date of Patent: Jun. 24, 2025

(54) INTELLIGENT SYSTEMS AND METHODS FOR VISUAL SEARCH QUERIES

(71) Applicant: Google LLC, Mountain View, CA (US)

(72) Inventors: Brett Aladdin Barros, San Mateo, CA (US); Joshua Lee Fleetwood, San Jose, CA (US); Paulo Jose Telo Coelho, Seattle, WA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/743,754

(22) Filed: Jun. 14, 2024

(65) Prior Publication Data

US 2024/0330357 A1    Oct. 3, 2024

Related U.S. Application Data

(62) Division of application No. 17/025,435, filed on Sep. 18, 2020, now Pat. No. 12,045,278.

(51) Int. Cl.
  *G06F 16/583*    (2019.01)
  *G06F 16/532*    (2019.01)
  (Continued)

(52) U.S. Cl.
  CPC .......... *G06F 16/532* (2019.01); *G06F 16/535* (2019.01); *G06F 16/538* (2019.01);
  (Continued)

(58) Field of Classification Search
  CPC .................................................. G06F 16/583
  (Continued)

(56) References Cited

U.S. PATENT DOCUMENTS

| | | | |
|---|---|---|---|
| 9,338,589 | B2 | 5/2016 | Loxam et al. |
| 2011/0125735 | A1 | 5/2011 | Petrou |

(Continued)

FOREIGN PATENT DOCUMENTS

| | | |
|---|---|---|
| CN | 103493069 | 1/2014 |
| JP | 2010/118019 | 5/2010 |
| JP | 2018/049623 | 3/2018 |

OTHER PUBLICATIONS

Chinese Search Report Corresponding to Application No. 2021111068703 on Apr. 14, 2025.

*Primary Examiner* — Kimberly L Wilson
(74) *Attorney, Agent, or Firm* — DORITY & MANNING P.A.

(57) ABSTRACT

A user can submit a visual query that includes one or more images. Various processing techniques such as optical character recognition (OCR) techniques can be used to recognize text (e.g. in the image, surrounding image(s), etc.) and/or various object detection techniques (e.g., machine-learned object detection models, etc.) may be used to detect objects (e.g., products, landmarks, animals, humans, etc.) within or related to the visual query. Content related to the detected text or object(s) can be identified and potentially provided to a user as search results or a proactive content feed. As such, aspects of the present disclosure enable the visual search system to more intelligently process a visual query to provide improved search results and content feeds, including those search results which are more personalized and/or consider contextual signals to account for implicit characteristics of the visual query and/or user's search intent.

20 Claims, 11 Drawing Sheets

(51) Int. Cl.
*G06F 16/535* (2019.01)
*G06F 16/538* (2019.01)
*G06F 16/55* (2019.01)
*G06F 16/901* (2019.01)

(52) U.S. Cl.
CPC ............ *G06F 16/55* (2019.01); *G06F 16/583* (2019.01); *G06F 16/9024* (2019.01)

(58) Field of Classification Search
USPC ........................................................ 707/769
See application file for complete search history.

(56) References Cited

U.S. PATENT DOCUMENTS

| | | |
|---|---|---|
| 2014/0143250 A1 | 5/2014 | Martin et al. |
| 2014/0149376 A1 | 5/2014 | Kutaragi et al. |
| 2016/0055182 A1 | 2/2016 | Petrou et al. |
| 2017/0206276 A1 | 7/2017 | Gill |
| 2017/0300495 A1 | 10/2017 | Sharifi et al. |
| 2018/0108066 A1 | 4/2018 | Kale et al. |
| 2019/0095466 A1 | 3/2019 | Zhai et al. |
| 2021/0034634 A1 | 2/2021 | Iyer et al. |

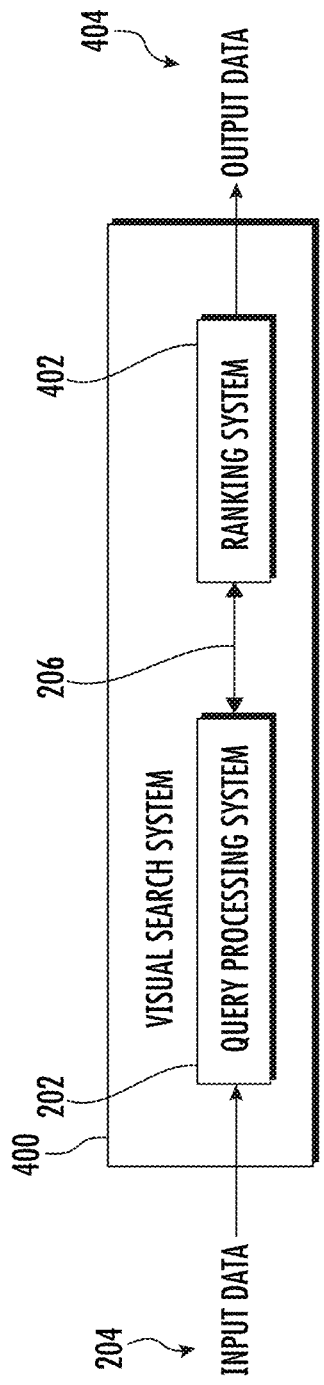
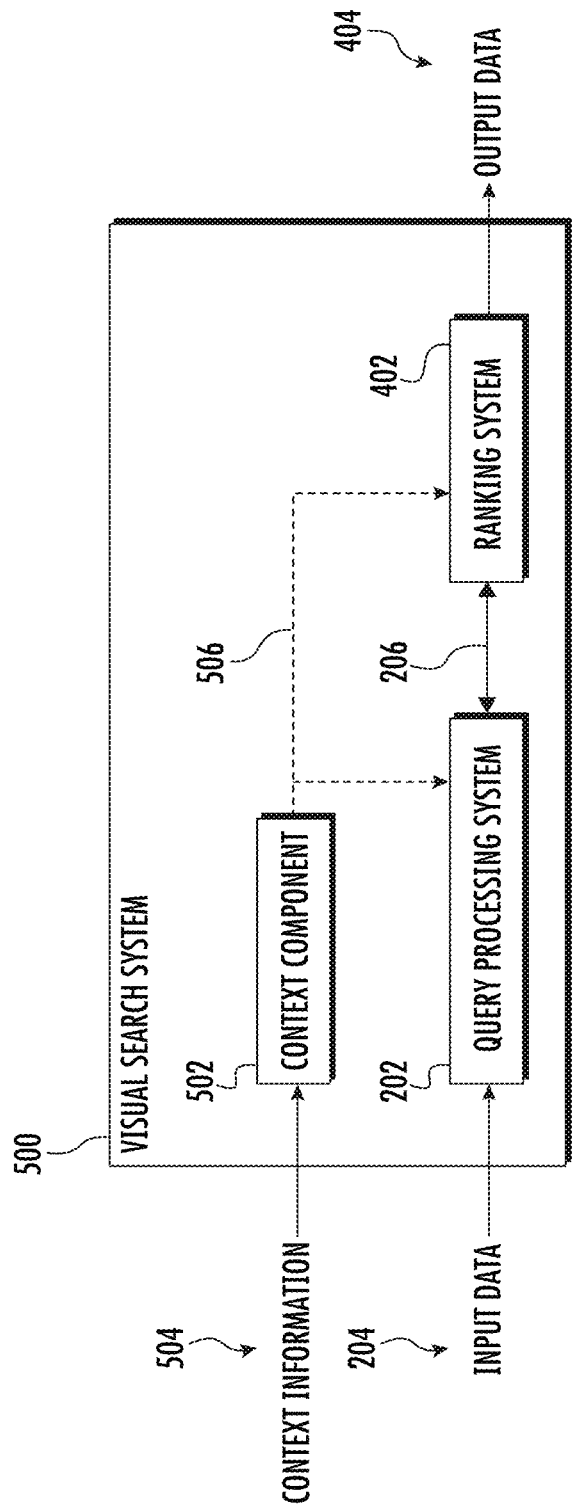

INTELLIGENT SYSTEMS AND METHODS FOR VISUAL SEARCH QUERIES

RELATED APPLICATIONS

The present application is a divisional of U.S. application Ser. No. 17/025,435 having a filing date of Sep. 18, 2020. Applicant claims priority to and the benefit of each of such application and incorporate all such application herein by reference in its entirety.

FIELD

The present disclosure relates generally to systems and methods for processing visual search queries. More particularly, the present disclosure relates to a computer visual search system that can be used to detect and recognize objects in images included in a visual query and provide more personalized and/or intelligent search results.

BACKGROUND

Text-based or term-based searching is a process where a user inputs a word or phrase into a search engine and receives a variety of results. Term-based queries require a user to explicitly provide search terms in the form of words, phrases, and/or other terms. Therefore, term-based queries are inherently limited by the text-based input modality and do not enable a user to search based on visual characteristics of imagery.

Alternatively, visual query search systems can provide a user with search results in response to a visual query that includes one or more images. Computer visual analysis techniques can be used to detect and recognize objects in images. For example, optical character recognition (OCR) techniques can be used to recognize text in images and/or edge detection techniques or other object detection techniques (e.g., machine learning-based approaches) can be used to detect objects (e.g. products, landmarks, animals, etc.) in images. Content related to the detected objects can be provided to the user (e.g., a user that captured the image in which the object is detected or that otherwise submitted or is associated with the visual query).

However, certain existing visual query systems have a number of drawbacks. As one example, current visual search query systems and methods may provide a user with results that may only relate to the visual query with respect to explicit visual characteristics such as color scheme, shapes, or depicting the same items/objects as the image(s) of the visual query. Stated differently, certain existing visual query systems focus exclusively on identifying other images that contain similar visual characteristics to the query image(s) which may fail to reflect the user's true search intent.

Accordingly, a system that can more intelligently process a visual query to provide the user with improved search results would be desirable.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for providing personalized visual search query result notifications within a user interface overlaid upon imagery. The method includes obtaining, by a computing system comprising one or more computing devices, a visual search query associated with a user, wherein the visual search query comprises an image. The method includes identifying, by the computing system, a plurality of candidate search results for the visual search query, wherein each candidate search result is associated with a particular sub-portion of the image, and wherein a plurality of candidate visual result notifications are respectively associated with the plurality of candidate search results. The method includes accessing, by the computing system, user-specific user interest data associated with the user and descriptive of visual interests of the user. The method includes generating, by the computing system, a ranking of the plurality of candidate search results based at least in part on a comparison of the plurality of candidate search results to the user-specific user interest data associated with the user. The method includes selecting, by the computing system, at least one of the plurality of candidate search results as at least one selected search result based at least in part on the ranking. The method includes providing, by the computing system, at least one selected visual result notification respectively associated with the at least one selected search result for overlay upon the particular sub-portion of the image associated with the selected search result.

Another example aspect of the present disclosure is directed to a computing system that returns content for multiple canonical items responsive to visual search queries. The computing system includes one or more processors and one or more non-transitory computer-readable media that store instructions that, when executed by the one or more processors, cause the computing system to perform operations. The operations include obtaining a visual search query, wherein the visual search query comprises an image that depicts an object. The operations include accessing a graph that describes a plurality of different items, wherein a respective set of content is associated with each of the plurality of different items. The operations include selecting, based on the visual search query, a plurality of selected items from the graph for the object depicted by the image. The operations include in response to the visual search query, returning a combined set of content as search results, wherein the combined set of content comprises at least a portion of the respective set of content associated with each of the plurality of selected items.

Another example aspect of the present disclosure is directed to a computing system to disambiguate between object-specific and categorical visual queries. The computing system includes one or more processors and one or more non-transitory computer-readable media that store instructions that, when executed by the one or more processors, cause the computing system to perform operations. The operations include obtaining a visual search query, wherein the visual search query comprises an image that depicts one or more objects. The operations include identifying one or more compositional characteristics of the image included in the visual search query. The operations include determining, based at least in part on the one or more compositional characteristics of the image included in the visual search query, whether the visual search query comprises an object-specific query that pertains specifically to the one or more objects identified within the image included in the visual search query or whether the visual search query comprises a categorical query that pertains to a general category of the one or more objects identified within the image included in the visual search query. The operations include, when it is determined that the visual search query comprises an object-specific query, returning one or more object-specific search results that pertain specifically to the one or more objects identified within the image included in the visual search query. The operations include, when it is determined that the visual search query comprises a categorical query, returning one or more categorical search results that pertain to the general category of the one or more objects identified within the image included in the visual search query.

Another example aspect of the present disclosure is directed to a computer-implemented method for returning content for multiple composed entities to visual search queries. The method includes obtaining a visual search query, wherein the visual search query comprises an image that depicts a first entity. The method includes identifying, based at least in part on one or more contextual signals, one or more additional entities associated with the visual search query. The method includes determining a composed query for content related to a combination of the first entity and the one or more additional entities. The method includes returning a set of content responsive to the visual search query, wherein the set of content comprises at least one content item responsive to the composed query and related to the combination of the first entity and the one or more additional entities.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 3 depicts a block diagram of an example visual search system including a query processing system and ranking system according to example embodiments of the present disclosure.

FIG. 4 depicts a block diagram of an example visual search system and context component according to example embodiments of the present disclosure.

Figure 1:
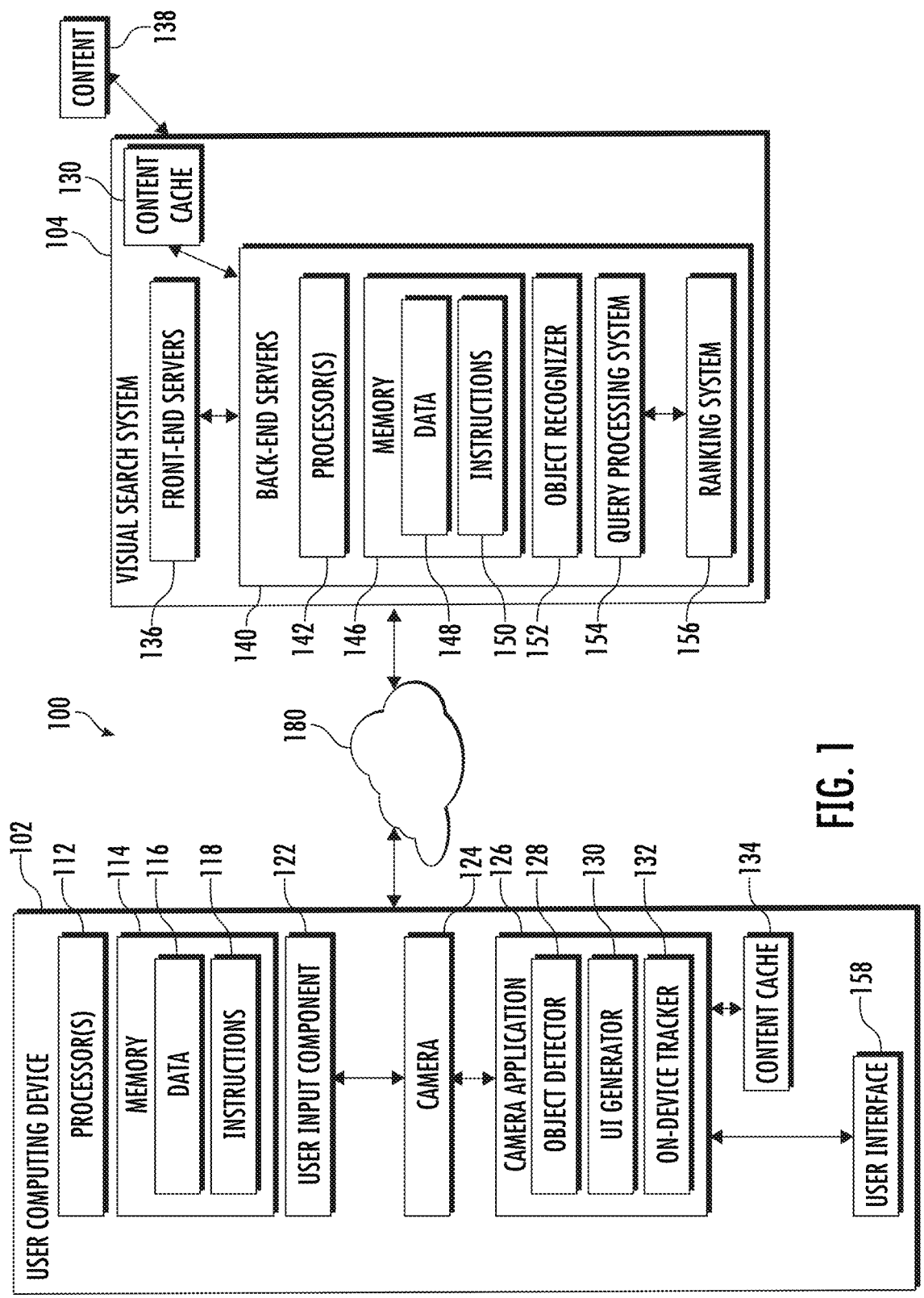
FIG. 1 depicts a block diagram of an example computing system according to example embodiments of the present disclosure.

Reference numerals that are repeated across plural figures are intended to identify the same features in various implementations.

DETAILED DESCRIPTION

Overview

Generally, the present disclosure is directed to a computer-implemented visual search system that can be used to detect and recognize objects in or related to a visual query and then provide more personalized and/or intelligent search results responsive to the visual query (e.g., in an overlay that augments the visual query). For example, a user can submit a visual query that includes one or more images. Various processing techniques such as optical character recognition (OCR) techniques can be used to recognize text (e.g. in the image, surrounding image(s), etc.) and/or various object detection techniques (e.g., machine-learned object detection models, etc.) may be used to detect objects (e.g., products, landmarks, animals, humans, etc.) within or related to the visual query. Content related to the detected text or object(s) can be identified and potentially provided to a user as search results. As such, aspects of the present disclosure enable the visual search system to more intelligently process a visual query to provide improved search results, including search results which are more personalized and/or consider contextual signals to account for implicit characteristics of the visual query and/or user's search intent.

Example aspects of the present disclosure provide more intelligent search results in response to a visual query. A visual query can include one or more images. For example, the images included in the visual query can be contemporaneously captured imagery or can be previously existing images. In one example, a visual query can include a single image. In another example, a visual query can include ten image frames from approximately three seconds of video capture. In yet another example, a visual query can include a corpus of images such as, for example, all images included in a user's photo library. For example, such as library could include an image of an animal at the zoo captured recently by the user, an image of a cat captured by the user some time ago (e.g., two months ago), and an image of a tiger saved into the library by the user from an existing source (e.g., from a website or screen capture). These images can represent a cluster of high affinity images for the user and embody (e.g., via a graph) the abstract idea that the user may have a "visual interest" in animal-like things. Any given user may have many such node clusters, each representing interests that are not well captured by words.

According to one example aspect, a visual search system can build and leverage a user-centric visual interest graph to provide more personalized search results. In one example use, the visual search system can use the graph of user interests to filter visual discovery alerts, notifications, or other opportunities. Thus, personalization of search results based on user interests may be particularly advantageous in example embodiments in which the search results are presented as visual result notifications (e.g., which may in some instances be referred to as "gleams") in an augmented overlay upon the query image(s).

More particularly, in some implementations, a visual search system can include or provide an augmented overlay user interface that serves to provide visual result notifications for search results as an overlay upon image(s) included in a visual query. For example, a visual result notification can be provided at a location that corresponds to the portion of the image relevant to the search result (e.g., a visual result notification may be shown "on top of" an object relevant to the corresponding search result). Thus, in response to a visual search query, a plurality of candidate search results can be identified, and a plurality of candidate visual result notifications may be respectively associated with the plurality of candidate search results. However, in the case where the underlying visual search system is particularly powerful and wide-ranging, an overwhelming number of candidate visual result notifications may be available such that presentation of all candidate visual result notifications would cause the user interface to be confusingly crowded or otherwise undesirably obscure the underlying image. As such, according to one aspect of the present disclosure, the computer visual search system may build and leverage a user-centric visual interest graph to rank, select, and/or filter the candidate visual result notifications based on observed user visual interests, thereby providing a more intuitive and streamlined user experience.

In some implementations, the user-specific interest data (e.g., which may be represented using a graph) can be aggregated over time at least in part by analyzing images that the user has engaged with in the past. Stated differently, a computing system can attempt to understand a user's visual interests by analyzing images with which the user engages over time. When a user engages with an image, it can be inferred that some aspect of the image is interesting to the user. Therefore, items (e.g., objects, entities, concepts, products, etc.) that are included within or otherwise related to such images can be added or otherwise noted within the user-specific interest data (e.g., graph).

As one example, images that a user engages with can include user-captured photographs, user-captured screenshots, or images included in web-based or application-based content viewed by the user. In another, potentially overlapping example, images that a user engages with can include actively engaged images with which the user has actively engaged by requesting an action to be performed on the image. For example, the requested action can include performing a visual search relative to the image or explicitly marking by the user that the image includes a visual interest of the user. As another example, images that a user engages with can include passively observed images that were presented to the user but not specifically engaged with by the user. Visual interests can also be inferred from textual content entered by the user (e.g., text- or term-based queries).

In some implementations, user interests reflected in the user-centric visual interest graph may be exact, categorical, or abstract items (e.g., entities). For example, an exact interest may correspond to a particular item (e.g., a specific work of art), a categorical interest may be a category of items (e.g., Art Nouveau paintings), and an abstract interest may correspond to interest that is challenging to capture categorically or with text (e.g., "artwork that appears visually similar to 'The Kiss' by Gustav Klimt").

Interest may be indicated in the user-centric visual interest graph by overlaying or defining (e.g., and then periodically updating) a variable weighted level of interest across the exact, category, or abstract items of interest. User interest in various items can be inferred or determined by evaluating the variable weighted level of interest for the item and/or for related items (e.g., items connected to or within n hops from the item within the graph).

In some implementations, the variable weighted interest bias assigned to an identified visual interest decays over time such that the user-specific interest data is based at least in part on time frame of expressed interest. For example, a user may express intense interest for a particular topic for a duration of time and then not express interest at all afterwards (e.g. the user may express intense interest in a particular band for a year). The user interest data can decay over time to reflect the user's change in interest and, if enough decay occurs, then as a result the visual search system may not continue to show query results to the user relating to the topic that the user no longer is interested in.

Thus, in some implementations, a visual interest graph can be a descriptive collection of user interests/personalization (e.g., based on many images they have seen historically). The graph can be constructed by analyzing the attributes of many images historically and using that information to find other images (e.g., and associated content generally, like a collection of news articles) of interest.

The visual search system can use the user-specific user interest data to generate a ranking of the plurality of candidate search results based at least in part on a comparison of the plurality of candidate search results to the user-specific user interest data associated with the user. For example, the weights for the items can be applied to modify or re-weight initial search scores associated with the candidate search results.

The search system can select at least one of the plurality of candidate search results as at least one selected search result based at least in part on the ranking and then provide at least one selected visual result notification respectively associated with the at least one selected search result for overlay upon the particular sub-portion of the image associated with the selected search result. In such fashion, user interests can be used to provide personalized search results and reduce clutter in a user interface.

In another example, the user-centric visual interest graph can be used to curate a user-specific feed based on visual information and interests. Specifically, in a feed, a set of personalized content can be displayed to a user without a single specific image being the basis. Rather, the analysis of a collection of prior images can establish a graph as described above, with, e.g., images (and/or image meta data such as depicted entities) as nodes, and then connections between these nodes as edges determining the strength of interests. A new visual media item (e.g., image or video) can then also have associated "strengths" to the user's interests given their graph. This new media could then be proactively suggested to the user without a prior query (e.g., as part of the feed that is provided to a user in certain contexts such as opening a new tab in a browser application).

Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

According to another aspect, the computer-implemented visual search system can identify and return a combined set of content (e.g., user-generated content) for multiple canonical items responsive to visual search queries. In particular, because visual search queries enable a more expressive and fluid modality of search input, both understanding the granularity and object(s) of user intent is a challenging task. For example, imagine that a user has just watched a particular movie. There is a significant amount of visual content that the user could submit as a visual query that would reflect a user interest in receiving content about the movie. It could be the closing credits, physical media (e.g., a disc) of the movie, the package cover, a receipt for the movie, or a trailer that reminded the user of the movie the next day. Thus, mapping a world's worth of imagery to specific items is a challenging problem. Conversely, understanding the intended granularity of a user's query is challenging. For example, a visual query that includes an image depicting the package cover for a particular movie may be intended to search for the content about that specific movie, content about actor(s) within the movie, content about the director of the movie, content about the artist that generated the package cover, content about movies of the same genre (e.g., horror) as the movie, or even more specific content such as content specifically about a particular version of the movie (e.g., the 2020 "director's cut" release vs. all versions of the movie; the DVD version vs. the Blu-Ray version; etc.).

The present disclosure resolves these challenges by enabling the return of a combined set of content for multiple canonical items responsive to a visual search query. In particular, in response to a visual search query that includes an image depicts an object, the visual search system can access a graph that describes a plurality of different items, wherein a respective set of content (e.g., user generated content such as product reviews) is associated with each of the plurality of different items. The visual search system can select, based on the visual search query, a plurality of selected items from the graph for the object depicted by the image and then return a combined set of content as search results, where the combined set of content includes at least a portion of the respective set of content associated with each selected item. By returning content related to multiple canonical items, the visual search system can avoid providing results that are overly specific to a particular entity that may be recognized in the visual query. To continue the example above, while certain existing systems may return content related only to the 2020 "director's cut" release of the movie, the proposed system may return content related to the 2020 "director's cut" release but also content related to the other related entities such as content related to content about actor(s) within the movie, content about the director of the movie, content about the artist that generated the package cover, etc.

Various techniques can be used to enable the selection of the items from the graph. In one example which may enable advantageous handling of "aesthetic-secondary" visual searches (e.g., searches that are seeking information about particular items rather than abstract aesthetic characteristics), the graph may be a hierarchical representation of the plurality of different items. Selecting the plurality of selected items from the graph can include identifying, based on the visual search query, a primary item in the graph that corresponds to the object depicted in the image (e.g., the particular movie shown in the image). Next, the visual search system can identify one or more additional items in the graph that are related to the primary item within the hierarchical representation of the graph and select the primary item and the one or more additional items as the plurality of selected items. The additional items may be in the same hierarchical level (e.g., other movies by the same director), may be in a "higher" hierarchical level (e.g., other movies of the same genre), and/or may be in a "lower" hierarchical level (e.g., the 2020 "director's cut" release of the movie and the 1990 original theatrical release).

In another example which may enable advantageous handling of "aesthetic-primary" visual searches (e.g., searches that are seeking content related to abstract visual or aesthetic characteristics rather than specific canonical items), the graph that describes the plurality of different items can include a plurality of nodes that correspond to a plurality of indexed images. The plurality of nodes can be arranged within the graph based at least in part on visual similarity among the indexed images such that a distance between a pair of nodes within the graph is inversely related to visual similarity between a corresponding pair of indexed images (i.e., nodes for more similar images are "closer" to each other within the graph). In one example, the plurality of nodes of the graph can be arranged into a plurality of clusters and selecting the plurality of selected items from the graph based on the visual search query can include performing an edge threshold algorithm to identify a primary cluster of the plurality of clusters and selecting the nodes included in the primary cluster as the plurality of selected items. In another example, the visual search system can perform the edge threshold algorithm to directly identify a plurality of visually similar nodes that are visually similar to the object depicted by the image (e.g., as opposed to identifying a cluster). The visual search system can select the visually similar nodes as the plurality of selected items. Examples of "edges" or "dimensions" by which product image searches might match include recognition-derived attributes such as category (e.g., "dress"), attributes (e.g., "sleeveless"), or other semantic dimensions and/or visual attributes such as "dark with light accents," "light accents are thin lines composing 40% of the overall color space," etc., including machine-generated visual attributes such as machine-extracted visual features or machine-generated visual embeddings.

Thus, example techniques are provided which enable a visual search system to more intelligently process a visual query and return content related to multiple canonical items rather than "overfitting" a user's query and returning content about only a single specific item, which may not have been the intended focus of the user's query.

According to another aspect, the computer-implemented visual search system can intelligently disambiguate a visual query between the specific objects depicted in the query image(s) versus categorical results. In particular, disambiguating between object-specific versus categorical queries is another example of the challenges associated with understanding the granularity and object(s) of user intent. For example, imagine that a user submits an image of cereal boxes and a query (e.g., a textual or spoken query) that requests "which has the most fiber." It can be difficult to tell whether the user's intent is to determine the cereal with the most fiber from amongst the cereals contained specifically within the visual query or if the user's intent is to determine the cereal with the most fiber in general. There are significant variations on the image submitted as well as the query which could lead to the same results being returned to the user, further underlining the difficulty of the task.

The present disclosure resolves these challenges by determining whether the visual search query comprises an object-specific query or a categorical query and then returning content which is object-specific or categorical in nature. Specifically, the computer visual search system can use additional contextual signals or information to provide more intelligent search results which account for relationships between multiple different objects present within a visual query. In particular, as one example, the visual search system can identify one or more compositional characteristics of the image included in the visual query. The visual search system can use the compositional characteristics to predict whether the visual query is a categorical query for which an expanded corpus of search results is relevant or an object-specific query that pertains specifically to the one or more objects identified within the visual query. To continue the example given above, the visual search system can use the compositional characteristics of the image depicting the cereals to determine whether the visual query image pertains to all cereals, all cereals of a certain brand or type, or to only those cereals contained in the image.

Upon determining that the visual search query comprises an object-specific query, the visual search system can return one or more object-specific search results directed specifically to the one or more objects identified within the visual query (e.g., the cereal with the highest fiber content from the cereals captured in the image). Alternatively, upon determining that the visual search query comprises a categorical query, the visual search system can return one or more categorical search results directed to the general category of the one or more objects identified within the visual query (e.g., the cereal with the highest fiber content from all cereals, or, as another example, the cereal with the highest fiber content from all cereals of the same type or brand).

The compositional characteristics used by the visual search system can include various attributes of the image. In one example, the compositional characteristics of the image can include a distance to the one or more objects identified within the image (e.g., from the camera that captured the photo). For example, images that include objects located closer to the camera are more likely to be specific to the depicted objects while images that include objects located farther from the camera are more likely to be categorical in nature. To provide an example, a user seeking information about a particular cereal is likely to stand close to the particular cereal box and capture the visual query versus the cereal aisle as whole.

In another example, the compositional characteristics of the image can include a number of the one or more objects identified within the image. In particular, an image with a greater number of objects identified may be more likely to indicate a likelihood that the visual query was directed toward a categorical query compared to an image with a lower number of identified objects which may be more likely to indicate a likelihood that the visual query was directed toward an object-specific query (e.g. an image with 3 cereal boxes may be more likely to indicate a visual query directed specifically to the one or more objects identified objects within the visual query as compared to an image with 25 cereal boxes which may be more likely to indicate a visual query directed to a general category of the one or more objects identified in the visual query).

In another example, the compositional characteristics of the image can include a relative likeness of the one or more objects identified within the image to each other. In particular, an image containing multiple objects with a high likeness of the other objects in the image may be more likely to indicate a likelihood that the visual query was directed toward a categorical query compared to an image containing multiple objects with a low likeness of the other objects which may be more likely to indicate a likelihood that the visual query was directed toward an object-specific query. As an example, an image with a cereal box and a bowl may be more likely to indicate a visual query directed specifically to the one or more objects identified within the visual query as compared to an image with multiple cereal boxes which may be more likely to indicate a visual query directed to a general category of the one or more objects identified in the visual query.

As another example, the compositional characteristics of the image can include an angular orientation of the one or more objects within the image. In particular, an image containing an image of an object with haphazard angular orientations may be more likely to indicate a likelihood that the visual query was directed toward a categorical query compared to an image containing an object with particular angular orientations which may be more likely to indicate a likelihood that the visual query was directed toward an object-specific query. For example, an image with a cereal box at a 32 degree angle with respect to the edge of the image may be more likely to indicate a visual query directed toward a categorical query compared to an image containing a cereal box at a 90 degree angle with respect to the edge of the image (e.g., a face of the box is shown clearly and is facing toward the camera) which may be more likely to indicate a visual query directed specifically to the one or more objects identified within the visual query.

As another example, the compositional characteristics of the image can include a centeredness of the one or more objects within the image (i.e., a degree to which the object(s) are positioned at the center of the image). In particular, an image containing objects that are not centered or within a threshold of centered may be more likely to indicate a likelihood that the visual query was directed toward a categorical query compared to an image containing an object that is centered or within a threshold of centered which may be more likely to indicate a likelihood that the visual query was directed toward an object-specific query. Furthermore, a ratio of the measurements from the edges of the image to the identified object may be used to obtain how centered an object in the visual query is (e.g. an image with a cereal box located with a 1:6:9:3 ratio may be more likely to indicate a visual query directed toward a categorical query compared to an image containing a cereal box with a 1:1:1:1 ratio which may be more likely to indicate a visual query directed specifically to the one or more objects identified within the visual query).

In some embodiments, the contextual signals or information to provide more intelligent search results which account for relationships between multiple different objects present within a visual query can comprise a location of a user at a time of the visual search query. In particular, certain locations that a user is located at upon making the visual search query (e.g. a grocery store) may be more likely to indicate a likelihood that the visual query was directed toward a categorical query compared to other locations (e.g. a private residence) which may be more likely to indicate a likelihood that the visual query was directed toward an object-specific query. Locations may be more likely to indicate the categorical visual query if there is a likelihood that there is a plurality of options available to the user as compared to locations with limited options which may be more likely to indicate the object-specific visual query.

In some embodiments, determining whether the visual search query comprises an object-specific query or a categorical query can be further based on a filter associated with the visual search query. In particular, the filter may incorporate user history as information whether the user may be more likely to make a categorical query or an object-specific query for the one or more objects comprising the image of the visual query. Alternatively or additionally, the filter can include a textual or verbal query entered by the user in association with the visual query. For example, the verbal query "Which cereal is healthiest?" is more likely to be categorical while the verbal query "Which of these three is healthiest?" is likely object-specific.

In some embodiments, the visual search system can return one or more categorical search results directed to the general category of the one or more objects identified within the visual query. In particular, returning one or more categorical search results directed to the general category of the one or more objects identified within the visual query can comprise first generating a collection of discrete categories of objects that at least one of the one or more objects within the image classifies under (e.g. category of item, brand within category of item, etc.). Furthermore, the visual search system could then select a plurality of selected discrete categories of objects from the collection. More particularly, the visual search system may use at least one contextual signal or information to determine which among the collection of discrete categories to select. Finally, the visual search system could return a combined set of content as search results, wherein the combined set of content comprises results associated with each of the plurality of selected discrete categories of objects. Specifically, the visual search system could return a plurality of results to the user wherein the results may be hierarchically displayed by greatest likelihood.

Thus, example techniques are provided which enable a visual search system to more intelligently process a visual query and return content related to categorical content or object-specific content depending on the contextual information provided in the visual query that the user provides.

According to another aspect, the computer-implemented visual search system can return content for multiple composed entities to visual search queries. In particular, understanding when a user is seeking information regarding a specific composition of multiple entities in visual search queries is another example of how understanding the granularity and object(s) of user intent is a challenging task. For example, imagine that a user submits or otherwise selects an image of Emma Watson and Daniel Radcliffe at the Oscars for inclusion in a visual search query. It can be difficult to tell whether the user's intent is to query about Emma Watson, Daniel Radcliffe, the Oscars, Emma Watson at the Oscars, Harry Potter, or other various combinations of entities. There are significant variations on the image submitted as well as the query which could lead to the same results being returned to the user, further underlining the difficulty of the task. Certain existing systems would fail to account for any composition of multiple entities at all and, instead, would simply return images that are most visually similar (e.g., at the pixel level such as similar background color) to such a visual query.

In contrast, the present disclosure resolves these challenges by enabling the visual search system to return content to the user based on determining compositions of multiple entities and composing a query for such compositions of entities. In particular, the computer visual search system can identify, based on one or more contextual signals or information, one or more entities associated with the visual search query. Upon identifying more than one entity associated with the visual search query, the visual search system can determine a composed query for content related to a combination of the first entity and the one or more additional entities (e.g. "Harry Potter awards at 2011 Oscars"). An entity can include people, objects, and/or abstract entities such as events. Upon determining a composed query for content related to a combination of the first entity and the one or more additional entities, the visual search system can obtain and return a set of content, where the set of content includes at least one content item responsive to the composed query and related to the combination of the first entity and the one or more additional entities. To continue the example given above, in response to the image of Emma Watson and Daniel Radcliffe at the Oscars, the visual search system can construct a composed query and return search results for nominations and awards won by Harry Potter cast and crew at the 2011 Oscars.

The contextual signals or information used to determine whether the visual query relates to a composition of multiple entities can include various attributes of the image, information about where the image was sourced by the user, information about other uses or instances of the image, and/or various other contextual information. In one example, the image used in the visual search query is present in a web document (e.g., a web page). More specifically, the web document may reference entities in one or more portions. In particular, those references may be textual (e.g., "2011 Oscar designers") or imagery (e.g., 2011 Oscar red carpet photos) and those entities can be identified as the additional entities associated with the visual search (e.g., "Emma Watson 2011 Oscars dress designer"). Thus, if a user selects an image of Emma Watson contained in a web page for submission as a visual query, references to other entities (e.g., textual and/or visual references) can be used to identify potential additional entities which may be used to form the composition of multiple entities.

As another example, the contextual signals or information of the image can include additional web documents that include additional instances of the image associated with the visual search query (e.g., multiple articles discussing how Harry Potter swept the Oscars). In particular, the one or more additional entities that are referenced by the one or more additional web documents may be identified as the additional entities associated with the visual search (e.g., "Harry Potter 2011 Oscars awards"). Thus, if a user selects a first instance of an image of Emma Watson contained in a first web page for submission as a visual query, additional instances of that same image can be identified in other, different web pages (e.g., via performance of a typical reverse image search) and then references to other entities (e.g., textual and/or visual references) contained in such other, different web pages can be used to identify potential additional entities which may be used to form the composition of multiple entities.

As another example, the contextual signals or information of the image can include textual metadata (e.g., "Emma Watson and Daniel Radcliffe after winning at the Oscars"). In particular, textual metadata may be accessed and may be identified as the additional entities associated with the visual search (e.g., "Harry Potter 2011 Oscars awards"). Specifically, textual metadata may include captions to the image used in the visual query submitted by the user.

As another example, the contextual signals or information of the image can include location or time metadata (e.g., Kodak Theatre, Los Angeles) In particular, location or time metadata may be accessed and may be identified as the additional entities associated with the visual search wherein the location of the source of the image used in the visual search query may indicate a pertinent topical reference that may not be indicated elsewhere in the image itself (e.g., the image of Emma Watson and Daniel Radcliffe could be a generic one of them on a red carpet with no symbolism behind them signifying that they were at the Oscars leading to a search query such as "Emma Watson and Daniel Radcliffe at Kodak Theatre, Los Angeles, 2011").

As another example, the contextual signals or information of the image can include a preliminary search. More specifically, a first search may be made using the multiple entities identified (e.g., "Emma Watson and Daniel Radcliffe at Kodak Theatre, Los Angeles") and, upon obtaining a first set of preliminary search results, further entities may be identified which are referenced by the preliminary search results. In particular, entities that are identified in some number of preliminary results exceeding a threshold may be determined to be pertinent enough to be included in the following query (e.g., "Emma Watson and Daniel Radcliffe at the Oscars").

Thus, example techniques are provided which enable a visual search system to more intelligently process a visual query and return content related to multiple composed entities depending on the contextual signals or information in or provided by the visual query that the user provides.

The identification of relevant images or other content can be performed in response to an explicit search query or can be performed proactively in response to a general query for content for a user (e.g., as part of a feed such as a "discover feed" that proactively identifies and provides content to a user absent an explicit query. The term "search results" is intended to include both content that is identified responsive to a specific visual query and/or proactively identified for inclusion as proactive results in a feed or other content review mechanism. For example, a feed can include content based on a user's visual interest graph, without needing a specific initial intent declaration by the user.

With reference now to the Figures, example embodiments of the present disclosure will be discussed in further detail.

Example Devices and Systems

FIG. 1A depicts a block diagram of an example computing system 100 that performs personalized and/or intelligent searches in response to at least in part visual queries according to example embodiments of the present disclosure. The system 100 includes a user computing device 102 and a visual search system 104 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.), and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the camera application 126 of a user computing device 102 presents content related to objects recognized in a viewfinder of a camera 124 of the user computing device 102.

The camera application 126 can be a native application developed for a particular platform. The camera application 126 can control the camera 124 of the user computing device 102. For example, the camera application 126 may be a dedicated application for controlling the camera, a camera-first application that controls the camera 124 for use with other features of the application, or another type of application that can access and control the camera 124. The camera application 126 can present the viewfinder of the camera 124 in user interfaces 158 of the camera application 126.

In general, the camera application 126 enables a user to view content (e.g., information or user experiences) related to objects depicted in the viewfinder of the camera 124 and/or view content related to objects depicted in images stored on the user computing device 102 or stored at another location accessible by the user computing device 102. The viewfinder is a portion of the display of the user computing device 102 that presents a live image of what is in the field of the view of the camera's lens. As the user moves the camera 124 (e.g., by moving the user computing device 102), the viewfinder is updated to present the current field of view of the lens.

The camera application 126 includes an object detector 128, a user interface generator 130, and an on-device tracker 132. The object detector 128 can detect objects in the viewfinder using edge detection and/or other object detection techniques. In some implementations, the object detector 128 includes a coarse classifier that determines whether an image includes an object in one or more particular classes (e.g., categories) of objects. For example, the coarse classifier may detect that an image includes an object of a particular class, with or without recognizing the actual object.

The coarse classifier can detect the presence of a class of objects based on whether or not the image includes (e.g., depicts) one or more features that are indicative of the class of objects. The coarse classifier can include a light-weight model to perform a low computational analysis to detect the presence of objects within its class(es) of objects. For example, the coarse classifier can detect, for each class of objects, a limited set of visual features depicted in the image to determine whether the image includes an object that falls within the class of objects. In a particular example, the coarse classifier can detect whether an image depicts an object that is classified in one or more of classes including but not limited to: text, barcode, landmark, people, food, media object, plant, etc. For barcodes, the coarse classifier can determine whether the image includes parallel lines with different widths. Similarly, for machine-readable codes (e.g., QR codes, etc.), the coarse classifier can determine whether the image includes a pattern indicative of the presence of a machine-readable code.

The coarse classifier can output data specifying whether a class of object has been detected in the image. The coarse classifier can also output a confidence value that indicates the confidence that the presence of a class of object has been detected in the image and/or a confidence value that indicates the confidence that an actual object, e.g., a cereal box, is depicted in the image.

The object detector 128 can receive image data representing the field of view of the camera 124 (e.g., what is being presented in the viewfinder) and detect the presence of one or more objects in the image data. If at least one object is detected in the image data, the camera application 126 can provide (e.g., transmit) the image data to a visual search system 104 over the network 180. As described below, the visual search system 104 can recognize objects in the image data and provide content related to the objects to the user computing device 102.

The visual search system 104 includes one or more front-end servers 136 and one or more back-end servers 140. The front-end servers 136 can receive image data from user computing devices, e.g., the user computing device 102. The front-end servers 136 can provide the image data to the back-end servers 140. The back-end servers 140 can identify content related to objects recognized in the image data and provide the content to the front-end servers 136. In turn, the front-end servers 136 can provide the content to the mobile device from which the image data was received.

The back-end servers 140 includes one or more processors 142 and a memory 146. The one or more processors 142 can be any suitable processing device (e.g., a processor core, a microprocessor, an ASIC, a FPGA, a controller, a microcontroller, etc.), and can be one processor or a plurality of processors that are operatively connected. The memory 146 can include one or more non-transitory computer-readable storage mediums, such as RAM, ROM, EEPROM, EPROM, flash memory devices, magnetic disks, etc., and combinations thereof. The memory 146 can store data 148 and instructions 150 which are executed by the processor(s) 142 to cause the visual search system 104 to perform operations. The back-end servers 140 can also include object recognizer 152, a query processing system 154, and a content ranking system 156. The object recognizer 152 can process image data received from mobile devices (e.g., user computing device 102, etc.) and recognize objects, if any, in the image data. As an example, the object recognizer 152 can use computer vision and/or other object recognition techniques (e.g., edge matching, pattern recognition, greyscale matching, gradient matching, etc.) to recognize objects in the image data.

In some implementations, the visual search system 104 includes or is otherwise implemented by one or more server computing devices. In instances in which the visual search system 104 includes plural server computing devices, such server computing devices can operate according to sequential computing architectures, parallel computing architectures, or some combination thereof.

In some implementations, the object recognizer 152 includes multiple object recognizer modules, e.g., one for each class of objects that recognizes objects in its respective class. For example, the object recognizer 152 can include a text recognizer module that recognizes text (e.g., recognizes characters, words, etc.) in image data, a barcode recognizer module that recognizes (e.g., decodes) barcodes (including machine-readable codes such as QR codes) in image data, a landmarks recognizer module that recognizes landmarks in image data, and/or other object recognizer modules that recognize a particular class of objects.

In some implementations, the query processing system 154 includes multiple processing systems. One example system can allow the system to identify a plurality of candidate search results. For instance, the system can identify a plurality of candidate search results upon first receiving a visual query image. On the other hand, the system can identify a plurality of search results after further processing by the system has already been done. Specifically, the system can identify a plurality of search results based on a more targeted query that the system has generated. Even more particularly, a system can generate a plurality of candidate search results when the system first receives a visual query image and then regenerate a plurality of candidate search results after further processing, based on a more targeted query that the system has generated.

As another example, the query processing system 154 can include a system generating user-specific interest data (e.g., which may be represented using a graph). More particularly, the user-specific interest data can be used in part to determine what results out of the plurality of candidate results would be most likely to be of interest to the user. Specifically, the user-specific interest data can be used in part to determine what results exceed a threshold so that they are worth showing to the user. For instance, the visual search system may not be able to output all the candidate results in an overlay on the user's interface. The user-specific interest data can help determine which candidate results will be output and which will not.

As another example, the query processing system 154 can include a system related to a combined set of content. More particularly, the combined set of content can refer to multiple canonical items that are responsive to the visual search query. In some implementations the system can include a graph that describes a plurality of items, wherein a respective set of content (e.g., user generated content such as product reviews) is associated with each of the plurality of different items. The combined set of content could be applied when a user provides a visual query image of an object with multiple canonical items responsive to visual search queries. For instance, if a user provides a visual query image of the package cover of a Blu-Ray of a particular movie, the combined set of content system can output results not only pertaining to Blu-Rays of that particular movie, but to the movie in general, the cast, or any number of content related to the movie.

As another example, the query processing system 154 can include a system related to compositional characteristics of the visual query image. More particularly, the compositional characteristics used by the visual search system can include various attributes of the image (number of objects in image, distance of object from the camera, angular orientation of image, etc.). The compositional characteristic system can be used as a part of intelligently disambiguating a visual query between the specific objects depicted in the query image versus categorical results. For instance, a user may submit an image of three cereal boxes accompanied by the textual query, "which has the most fiber." The compositional characteristic system can help disambiguate based on the compositional characteristics identified by the system whether the query was aimed at the three cereals captured or at cereals in total or at cereals of a particular brand.

As another example, the query processing system 154 can include a system related to multiple entities associated with the visual query. More particularly, the multiple entities refer to multiple subject matter contained in the image as well as in the context surrounding the image in any way (GPS coordinates of where image was taken, textual caption accompanying the image, web page that the image was found on, etc.). The multiple entities system can further compose a secondary query in combinations of entities to encompass all the candidate search results that the user could intend. For instance, an image of Emma Watson and Daniel Radcliffe standing in front of the Kodak Theatre in Los Angeles could have any number of user intent behind it beyond a search for "Emma Watson" or "Daniel Radcliffe." The multiple entities system could compose secondary queries such as, "Harry Potter at the Oscars", "Emma Watson Oscars designer" in response to the multiple entities identified.

In some implementations, the content ranking system 156 can be used in multiple different points of the visual search system process to rank the candidate search results. One example application is to generate a ranking of the search results after the plurality of search results is first identified. On the other hand, the initial search results may be only preliminary, and the ranking system 156 can generate a ranking of the search results after the query processing system has created a more targeted query. Even more particularly, the ranking system 156 can generate a ranking of the plurality of candidate search results when the system first identifies a set of candidate search results and then again after a more targeted query has been made (e.g., the preliminary ranking may be used to determine what combinations of multiple entities are most likely). The ranking that is created by the ranking system 156 can be used to determine the final output of the candidate search results to the user by determining what order the search results will be output in, and/or whether the candidate search result will be output or not.

The multiple processing systems contained in the query processing system 154 can be used in any combination with each other and in any order to process the visual queries submitted by users in the most intelligent way in order to provide the user with the most intelligent results. Furthermore, the ranking system 156 can be used in any combination with the query processing system 154.

After the content is selected, the content can be provided to the user computing device 102 from which the image data was received, stored in a content cache 130 of the visual search system 104, and/or stored at the top of a memory stack of the front-end servers 136. In this way, the content can be quickly presented to the user in response to the user requesting the content. If the content is provided to the user computing device 102, the camera application 126 can store the content in a content cache 134 or other fast access memory. For example, the camera application 126 can store the content for an object with a reference to the object so that the camera application 126 can identify the appropriate content for the object in response to determining to present the content for the object.

The camera application 126 can present content for an object in response to a user interacting with the visual indicator for the object. For example, the camera application 126 can detect user interaction with the visual indicator for an object and request the content for the object from the visual search system 104. In response, the front-end servers 136 can obtain the content from the content cache 130 or the top of the memory stack and provide the content to the user computing device 102 from which the request was received. If the content was provided to the user computing device 102 prior to the user interaction being detected, the camera application 126 can obtain the content from the content cache 134.

In some implementations, the visual search system 104 includes the object detector 128, e.g., rather than the camera application 126. In such examples, the camera application 126 can transmit image data to the visual search system 104 continuously, e.g., in a stream of images, while the camera application 126 is active or while the user has the camera application 126 in a request content mode. The request content mode can allow the camera application 126 to send image data to the visual search system 104 continuously in order to request content for objects recognized in the image data. The visual search system 104 can detect objects in the image, process the image (e.g., select visual indicators for the detected objects), and send the results (e.g., visual indicators) to the camera application 126 for presentation in the user interface (e.g., viewfinder). The visual search system 104 can also continue processing the image data to recognize the objects, select content for each recognized object, and either cache the content or send the content to the camera application 126.

In some implementations, the camera application 126 includes an on-device object recognizer that recognizes objects in image data. In this example, the camera application 126 can recognize the objects, and either request content for the recognized objects from the visual search system 104 or identify the content from an on-device content data store. The on-device object recognizer can be a lightweight object recognizer that recognizes a more limited set of objects or that uses less computationally expensive object recognition techniques than the object recognizer 152 of the visual search system 104. This enables mobile devices with less processing power than typical servers to perform the object recognition process. In some implementations, the camera application 126 can use the on-device recognizer to make an initial identification of an object and provide the image data to the visual search system 104 (or another object recognition system) for confirmation. The on-device content data store may also store a more limited set of content than the content data storage unit 138 or links to resources that include the content to preserve data storage resources of the user computing device 102.

The user computing device 102 can also include one or more user input components 122 that receive user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1 illustrates one example computing system that can be used to implement the present disclosure. Other different distributions of components can be used as well. For example, some or all of the various aspects of the visual search system can instead be located and/or implemented at the user computing device 102.

Example Model Arrangements

Figure 2:
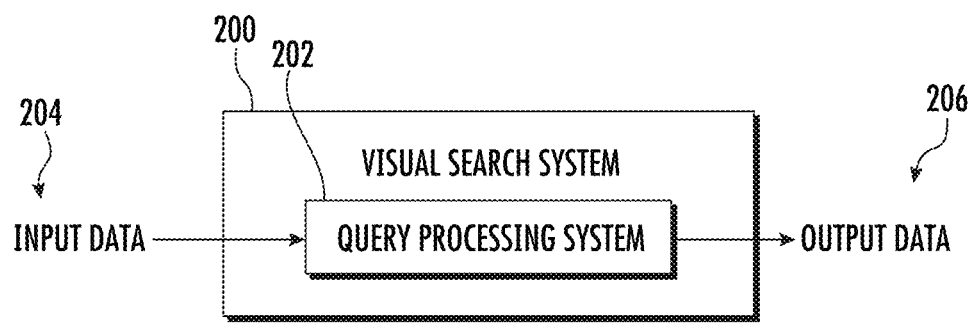
FIG. 2 depicts a block diagram of an example visual search system including a query processing system according to example embodiments of the present disclosure.

FIG. 2 depicts a block diagram of an example visual search system 200 according to example embodiments of the present disclosure. In some implementations, the visual search system 200 is configured to receive a set of input data that includes visual queries 204 and, as a result of receipt of the input data 204, provide output data 206 that provides the user with more personalized and/or intelligent results. As an example, in some implementations, the visual search system 200 can include a query processing system 202 that is operable to facilitate the output of more personalized and/or intelligent visual query results.

In some implementations, the query processing system 202 includes or leverages a user-centric visual interest graph to provide more personalized search results. In one example use, the visual search system 200 can use the graph of user interests to rank or filter search results, including visual discovery alerts, notifications, or other opportunities. Personalization of search results based on user interests may be particularly advantageous in example embodiments in which the search results are presented as visual result notifications (e.g., which may in some instances be referred to as "gleams") in an augmented overlay upon the query image(s).

In some implementations, the user-specific interest data (e.g., which may be represented using a graph) can be aggregated over time at least in part by analyzing images that the user has engaged with in the past. Stated differently, the visual search system 200 can attempt to understand a user's visual interests by analyzing images with which the user engages over time. When a user engages with an image, it can be inferred that some aspect of the image is interesting to the user. Therefore, items (e.g., objects, entities, concepts, products, etc.), that are included within or otherwise related to such images can be added or otherwise noted within the user-specific interest data (e.g., graph).

As one example, images that a user engages with can include user-captured photographs, user-captured screenshots, or images included in web-based or application-based content viewed by the user. In another, potentially overlapping example, images that a user engages with can include actively engaged images with which the user has actively engaged by requesting an action to be performed on the image. For example, the requested action can include performing a visual search relative to the image or explicitly marking by the user that the image includes a visual interest of the user. As another example, images that a user engages with can include passively observed images that were presented to the user but not specifically engaged with by the user. Visual interests can also be inferred from textual content entered by the user (e.g., text- or term-based queries).

Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

The visual search system 200 can use the query processing system 202 to select search results for the user. The user interest system 202 can be used at various stages of the search process including query modification, result identification, and/or other stages of a visual search process.

As one example, FIG. 3 depicts a block diagram of an example visual search system 400 according to example embodiments of the present disclosure. The visual search system 400 operates in a two-stage process. In a first stage, a query processing system 202 can receive the input data 204 (e.g., a visual query that includes one or more images) and generate a set of candidate search results 206 that are responsive to the visual query. For example, the candidate search results 206 can be obtained without regard for user-specific interests. In a second stage, the ranking system 402 can be used by the visual search system 400 to assist in ranking the one or more of the candidate search results 206 to return to the user as final search results (e.g., as the output data 404).

As one example, the visual search system 400 can use the ranking system 402 to generate a ranking of the plurality of candidate search results 206 based at least in part on a comparison of the plurality of candidate search results 206 to the user-specific user interest data associated with the user obtained in the query processing system 202. For example, the weights for certain items captured within the user interest data can be applied to modify or re-weight initial search scores associated with the candidate search results 206 which could further lead to a re-ranking of the search results 206 prior to output to the user 404.

The visual search system 400 can select at least one of the plurality of candidate search results 206 as at least one selected search result based at least in part on the ranking and then provide at least one selected visual result notification respectively associated with the at least one selected search result for display to the user (e.g., as output data 404). In one example, each of the selected search result(s) can be provided for overlay upon a particular sub-portion of the image associated with the selected search result. In such fashion, user interests can be used to provide personalized search results and reduce clutter in a user interface.

As another example variant, FIG. 4 depicts a block diagram of an example visual search system 500 according to example embodiments of the present disclosure. The visual search system 500 is similar to visual search system 400 of FIG. 3 except that the visual search system 500 further includes a context component 502 which receives context information 504 and processes the context information 504 to account for implicit characteristics of the visual query and/or user's search intent.

The contextual information 504 can include any other available signals or information that assist in understanding implicit characteristics of the query. For example, location, time of day, input modality, and/or various other information can be used as context.

As another example, the contextual information 504 can include various attributes of the image, information about where the image was sourced by the user, information about other uses or instances of the image, and/or various other contextual information. In one example, the image used in the visual search query is present in a web document (e.g., a web page). References to other entities (e.g., textual and/or visual references) included in the web document can be used to identify potential additional entities which may be used to form the composition of multiple entities.

In another example, the contextual information 504 can include information obtained from additional web documents that include additional instances of the image associated with the visual search query. As another example, the contextual information 504 can include textual metadata associated with the image (e.g., EXIF data). In particular, textual metadata may be accessed and may be identified as the additional entities associated with the visual search. Specifically, textual metadata may include captions to the image used in the visual query submitted by the user.

As another example, the contextual information 504 can include information obtained via a preliminary search based on the visual query. More specifically, a first search may be made using information from the visual query and, upon obtaining a first set of preliminary search results, further entities may be identified which are referenced by the preliminary search results. In particular, entities that are identified in some number of preliminary results exceeding a threshold may be determined to be pertinent enough to be included in a following query.

Referring to any of the visual search system 200, 400 and/or 500 of FIGS. 2, 3 and 4, a computing system can implement an edge detection algorithm to process the objects depicted in the images provided as the visual query input data 204. Specifically, the image acquired may be filtered with an edge detection algorithm (e.g., gradient filter), thereby obtaining a resulting image, which represent a binary matrix which may be measured in a horizontal and vertical direction determining position of objects contained in the image within the matrix. Additionally, the resulting image may further be advantageously filtered using a Laplacian and/or Gaussian Filter for improved detection of edges. Objects may then be compared against a plurality of training images and/or historical images of any kind and/or context information 504 with Boolean operators, such as "AND" and "OR" Boolean operators. Utilizing Boolean comparisons provides for very fast and efficient comparisons which is preferable however in certain circumstances non-Boolean operators may be desired.

Furthermore, a similarity algorithm may be accessed by the visual search system 200, 400 and/or 500 of FIGS. 2, 3 and/or 4 where the algorithm may access the edge detection algorithm described above and store the output data. Additionally, and/or alternatively the similarity algorithm can estimate a pairwise similarity function between each image and/or query input data 204 and a plurality of other images and/or queries and/or context information 504 that may be training data and/or historical data of any kind. The pairwise similarity function can describe whether two data points are similar or not.

Additionally, or alternatively, the visual search system 200, 400 and/or 500 of FIGS. 2, 3 and/or 4 can implement a clustering algorithm to process the images provided as a visual query input data 204. The search system may execute the clustering algorithm and assign images and/or queries to the clusters based upon the estimated pairwise similarity functions. The number of clusters can be an unknown prior to executing the clustering algorithm and can vary from one execution of the clustering algorithm to the next based on the images/visual query input data 204, the estimated pairwise similarity function for each pair of image/queries, and random or pseudo-random selection of an initial image/query assigned to each cluster.

The visual search system 200, 400 and/or 500 can execute the clustering algorithm once or multiple times on the set of image/query input data 204. In certain exemplary embodiments, the visual search system 200, 400 and/or 500 can execute the clustering algorithm a predetermined number of iterations. In certain exemplary embodiments, the visual search system 200, 400 and/or 500 can execute the clustering algorithm and aggregate the results until a measure of distance from the pairwise similarity function being non-transitive is reached.

Example Methods

Figure 9:
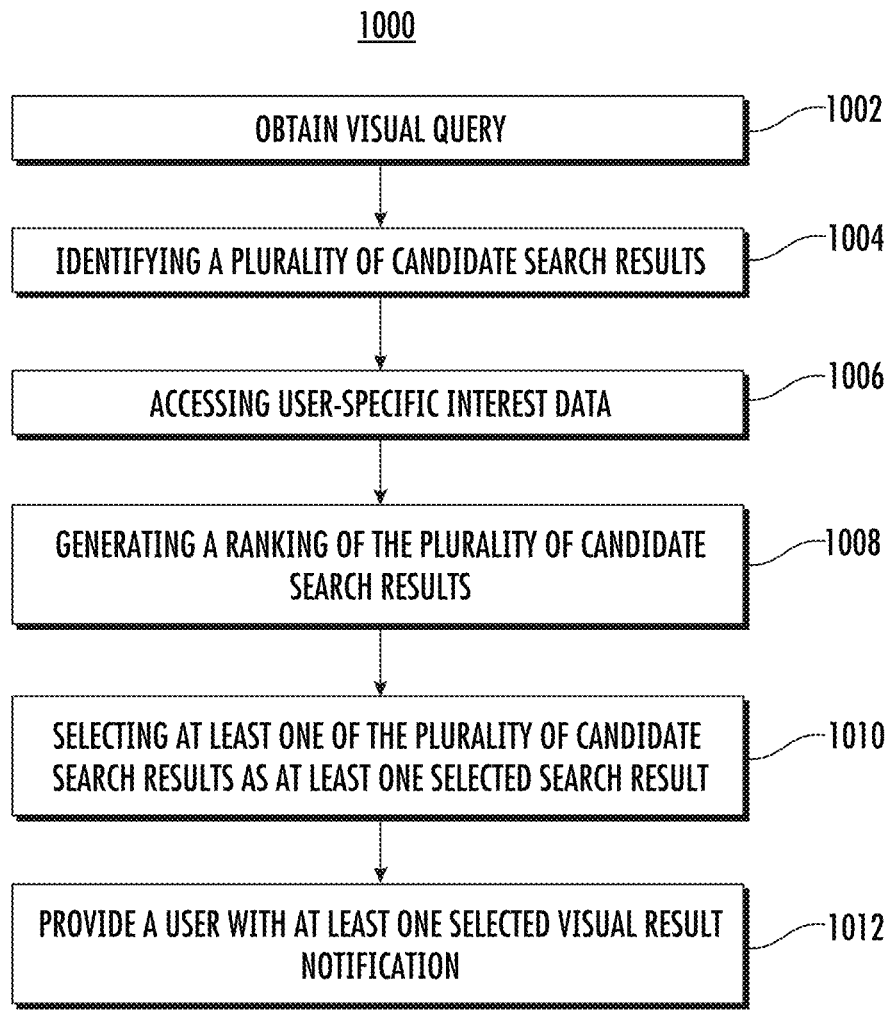
FIG. 9 depicts a flow chart diagram of an example method to perform a more personalized and/or intelligent visual search using a user-centric visual interest model according to example embodiments of the present disclosure.

FIG. 9 depicts a flow chart diagram of an example method 1000 to provide more personalized search results according to example embodiments of the present disclosure. Although FIG. 9 depicts steps performed in a particular order for purposes of illustration and discussion, the methods of the present disclosure are not limited to the particularly illustrated order or arrangement. The various steps of the method 1000 can be omitted, rearranged, combined, and/or adapted in various ways without deviating from the scope of the present disclosure.

At 1002, a computing system can obtain a visual query. For example, a computing system (e.g., user computing device 102 and visual search system 104 in FIG. 1) can obtain a visual query input data (e.g., visual query input data 204 of FIG. 2) from a user.

At 1004, the computing system can identify a plurality of candidate search results and corresponding search result notification overlays. For example, the computing system can receive, as an output of the visual search result model 402 in FIG. 3, the current plurality of candidate search results and corresponding augmented overlays on the user interface that serve to provide visual result notifications for search results as an overlay upon image(s) included in a visual query.

More particularly, the computing system can input the previously obtained visual query into a query processing system. For example, the computing system can input the visual query input data 204 into the query processing system 202. Prior to inputting the visual query, the computing system can access an edge detection algorithm. More specifically, the image acquired may be filtered with an edge detection algorithm (e.g., gradient filter), thereby obtaining a resulting image, which represent a binary matrix which may be measured in a horizontal and vertical direction determining position of objects contained in the image within the matrix.

At 1006, the computing system can leverage a user-centric visual interest graph to select, and/or filter the previously obtained plurality of candidate search results and corresponding search result notification overlays based on observed user visual interests. The user-centric visual interest graph can be contained by the query processing system. For example, the query processing system 202.

At 1008, the computing system can generate a ranking of the plurality of candidate search results. For example, the computing system can receive, as an output of the ranking system, for example, the ranking system 402, the current ranking of candidate search results and their corresponding search result notification overlays.

More particularly, the ranking system can generate the rankings based at least in part on a comparison of the plurality of candidate search results to the user-specific user interest data associated with the user contained in the query processing system. For example, the weights for the items can be applied to modify or re-weight initial search scores associated with the candidate search results.

In some implementations, the visual search system may account for duplicate notifications overlay in images that may be identified to contain more than one of the same object. The visual search system may output only one out of a plurality of potential candidate search result notification overlays that provide the same search result.

At 1010, the computing system can select at least one of the plurality of candidate search results as at least one selected search result, for example, output data 404. More particularly, the visual search system 400 can select at least one of the plurality of candidate search results as at least one selected search result based at least in part on the ranking and then provide at least one selected visual result notification respectively associated with the at least one selected search result for overlay upon the particular sub-portion of the image associated with the selected search result. In such fashion, user interests can be used to provide personalized search results and reduce clutter in a user interface.

At 1012, the computing system can provide a user with at least one selected visual result notification. For example, the computing system can provide the user with the output data 404 which comprise the predicted results based on the output of the query processing system 202.

Figure 5:
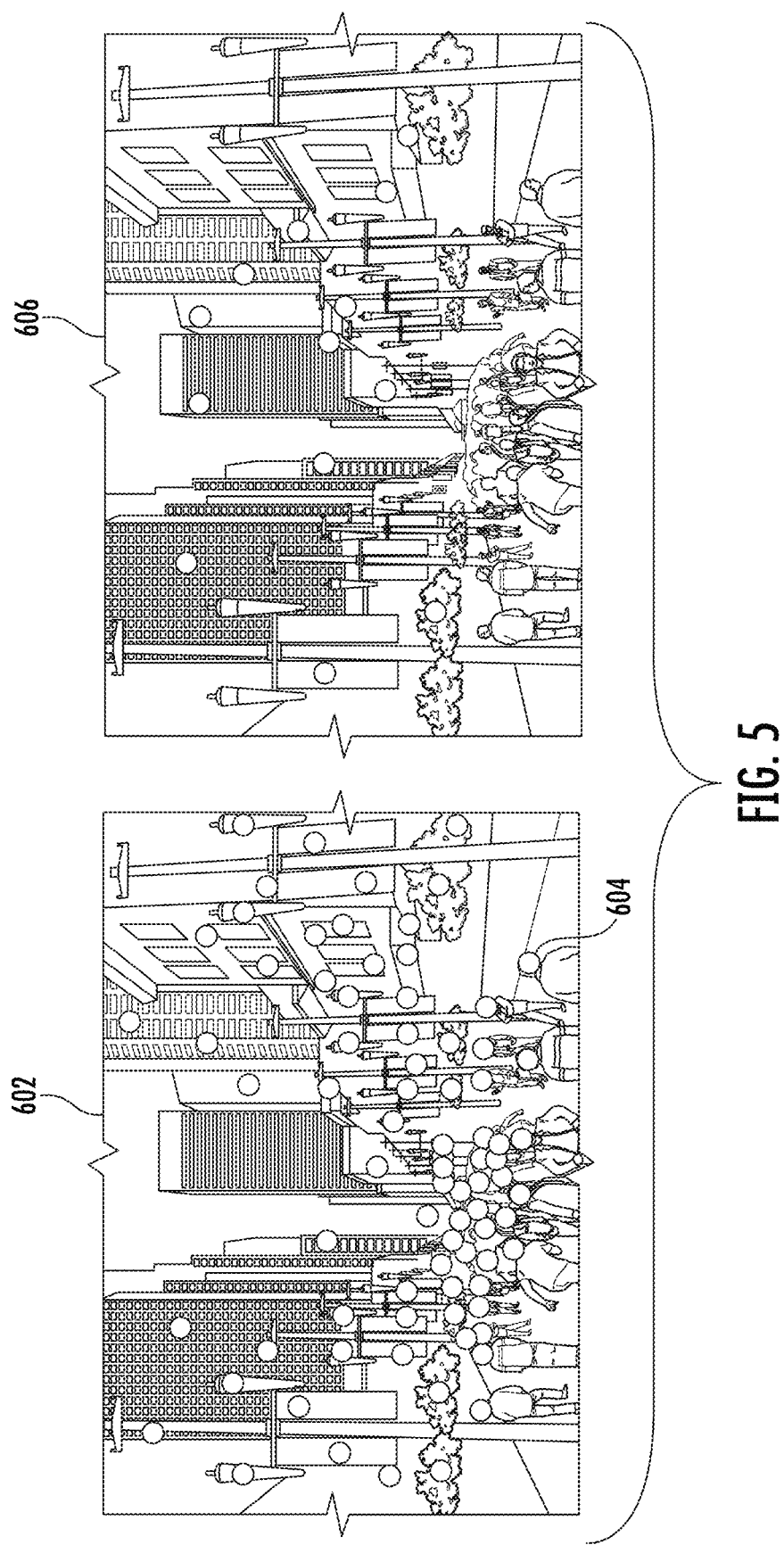
FIG. 5 illustrates a client system with a screen shot of contrasting example augmented reality visuals to illustrate differences, in accordance with some embodiments.

FIG. 5 illustrates the benefit of the example method described in FIG. 9. 602 shows an example augmented reality user interface without using the method described in FIG. 9. The user interface 602 illustrates that without the method described in FIG. 9, the interface 602 is overcluttered with notification overlays 604 such that the interface 602 is unusable to see through and additionally renders the notification overlays 604 difficult to use.

In contrast, the interface 606 shows an example augmented reality user interface using the method described in FIG. 9. Interface 606 illustrates that with the method described in FIG. 9, only selected notification overlays 604 are displayed such that the user can still see through the selection notification overlays 604 as well as easily access all the selected notification overlays 604.

Figure 10:
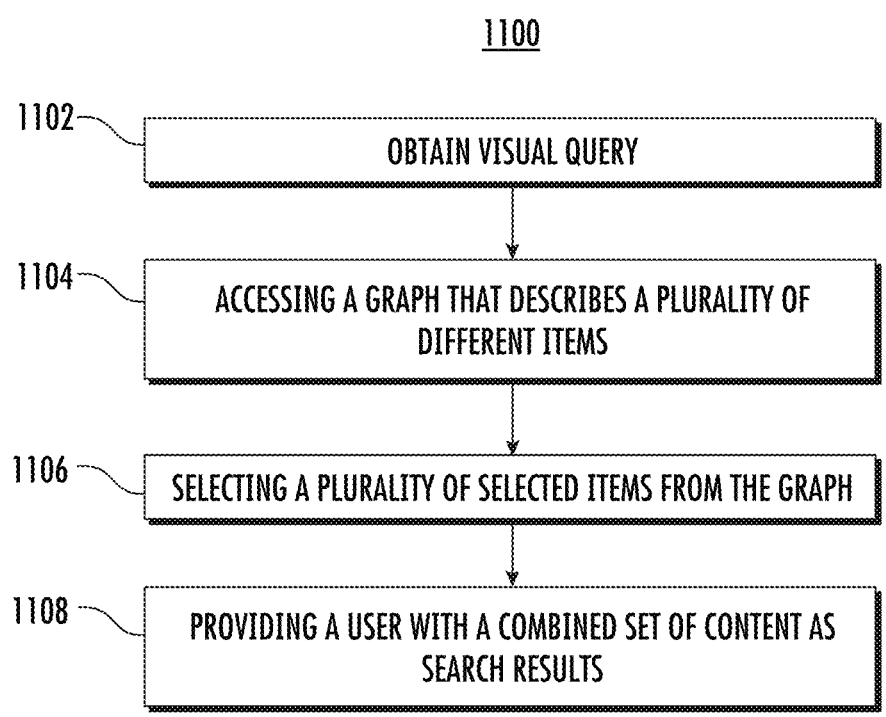
FIG. 10 depicts a flow chart diagram of an example method to perform a more personalized and/or intelligent visual search via a multiple canonical item to visual search queries according to example embodiments of the present disclosure.

FIG. 10 depicts a flow chart diagram of an example method 1100 according to example embodiments of the present disclosure. Although FIG. 10 depicts steps performed in a particular order for purposes of illustration and discussion, the methods of the present disclosure are not limited to the particularly illustrated order or arrangement. The various steps of the method 1100 can be omitted, rearranged, combined, and/or adapted in various ways without deviating from the scope of the present disclosure.

At 1102, a computing system can obtain a visual query. For example, a computing system (e.g., user computing device 102 and visual search system 104 in FIG. 1) can obtain a visual query input data 204 from a user.

At 1104, the computing system can access a graph that describes a plurality of different items. Specifically, a respective set of content (e.g., user generated content such as product reviews) is associated with each of the plurality of different items.

More particularly, the computing system can input the previously obtained visual query into a query processing system. For example, the computing system can input the visual query input data 204 into the query processing system 202.

At 1106, the computing system can select a plurality of selected items from the graph. More particularly, the query processing system 202 can leverage a graph that may be a hierarchical representation of the plurality of different items. Selecting the plurality of selected items from the graph can include identifying, based on the visual search query, a primary item in the graph that corresponds to the object depicted in the image (e.g., the particular movie shown in the image). Next, the visual search system can identify one or more additional items in the graph that are related to the primary item within the hierarchical representation of the graph and select the primary item and the one or more additional items as the plurality of selected items.

At 1108, the computing system can provide a user with a combined set of content as search results. For example, the computing system can provide the user with the output data 404 which comprise the predicted results based on the output of the visual search result model 202.

Figure 6:
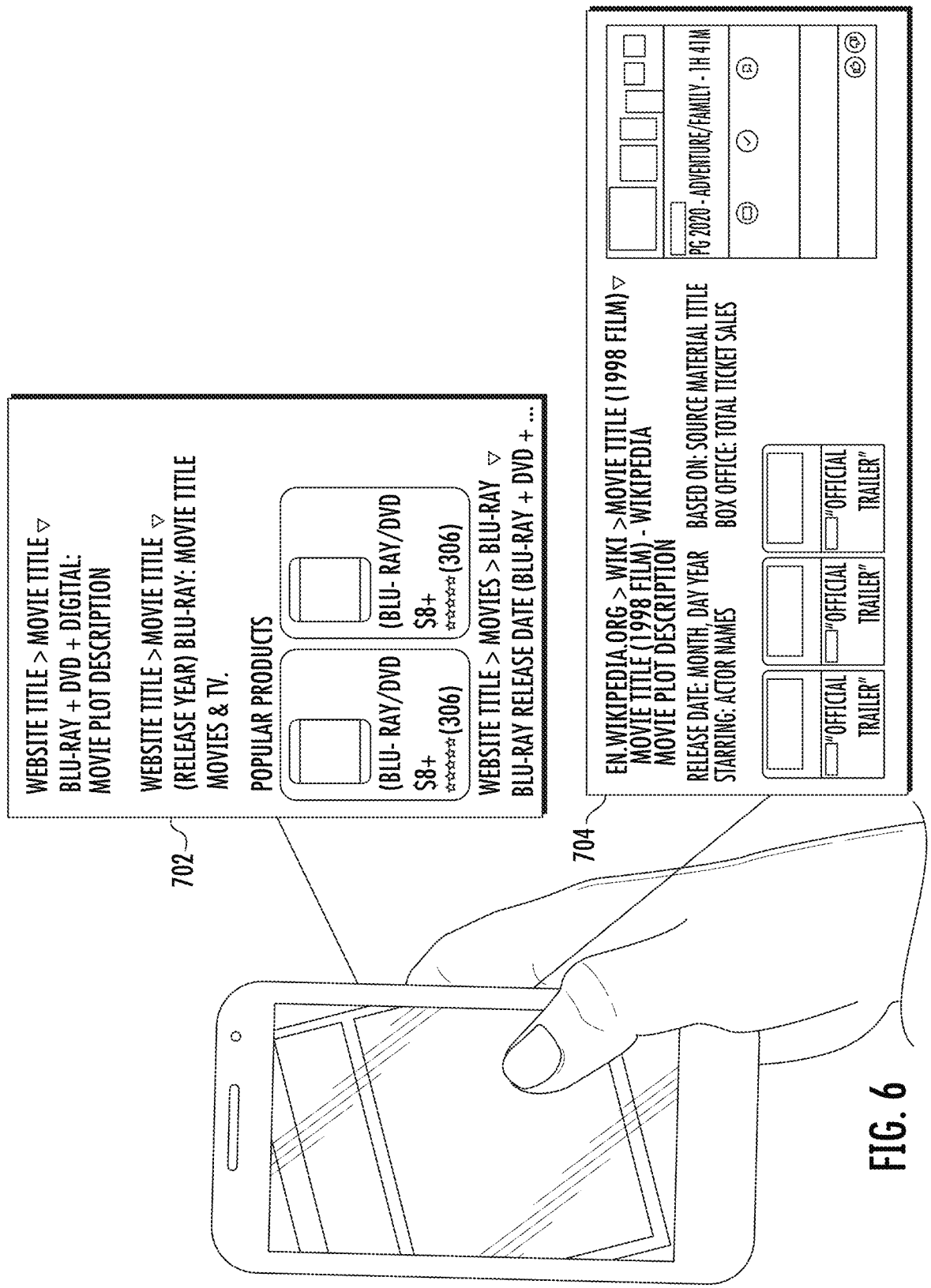
FIG. 6 illustrates a client system with a screen shot of contrasting example search results according to one object of interest to illustrate differences, in accordance with some embodiments.

FIG. 6 illustrates the benefit of the example method described in FIG. 10. User interface 702 shows example search results without using the method described in FIG. 10. User interface 702 illustrates that without the method described in FIG. 10, the search results include results that relate only to the exact same object used as the visual query. In contrast, user interface 704 shows example search results using the method described in FIG. 10. User interface 704 illustrates that with the method described in FIG. 10, the search results are expanded and include results associated with multiple canonical entities.

Figure 11:
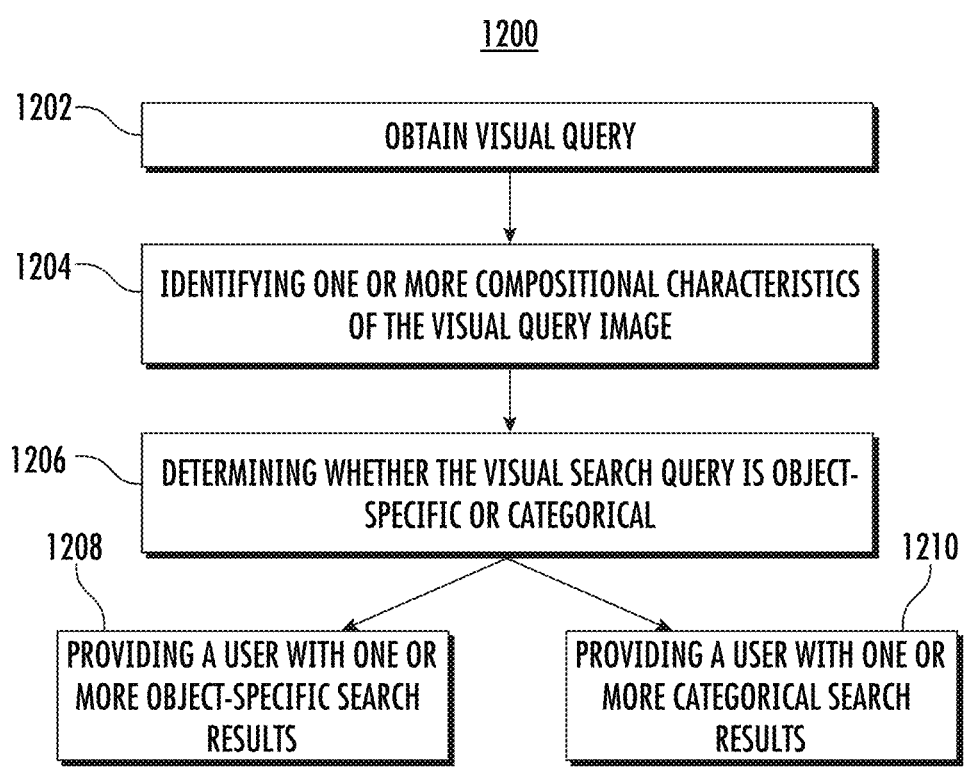
FIG. 11 depicts a flow chart diagram of an example method to perform a more personalized and/or intelligent visual search via disambiguating between object-specific and categorical visual queries according to example embodiments of the present disclosure.

FIG. 11 depicts a flow chart diagram of an example method 1200 according to example embodiments of the present disclosure. Although FIG. 11 depicts steps performed in a particular order for purposes of illustration and discussion, the methods of the present disclosure are not limited to the particularly illustrated order or arrangement. The various steps of the method 1200 can be omitted, rearranged, combined, and/or adapted in various ways without deviating from the scope of the present disclosure.

At 1202, a computing system can obtain a visual query. For example, a computing system (e.g., user computing device 102 and visual search system 104 in FIG. 1) can obtain a visual query input data 204 from a user.

At 1204, the computing system can identify one or more compositional characteristics of the visual query image. Specifically, various attributes of the image (e.g., distance to the one or more objects identified, number of objects, relative likeness of objects, angular orientation, etc.)

More particularly, the computing system can input the previously obtained visual query into a query processing system. For example, the computing system can input the visual query input data 204 into the query processing system 202. Prior to inputting the visual query, the computing system can access an edge detection algorithm. More specifically, the image acquired may be filtered with an edge detection algorithm (e.g., gradient filter), thereby obtaining a resulting image, which represent a binary matrix which may be measured in a horizontal and vertical direction determining position of objects contained in the image within the matrix.

At 1206, the computing system can determine whether the visual search query is object-specific or categorical. More particularly, the query processing system 202 can leverage the identified compositional characteristics to predict whether the visual query is a categorical query for which an expanded corpus of search results is relevant or an object-specific query that pertains specifically to the one or more objects identified within the visual query.

At 1208, the computing system can provide a user with one or more object-specific search results. For example, the computing system can provide the user with the output data 404 which comprise the predicted results based on the output of the visual search result model 202.

Figure 7:
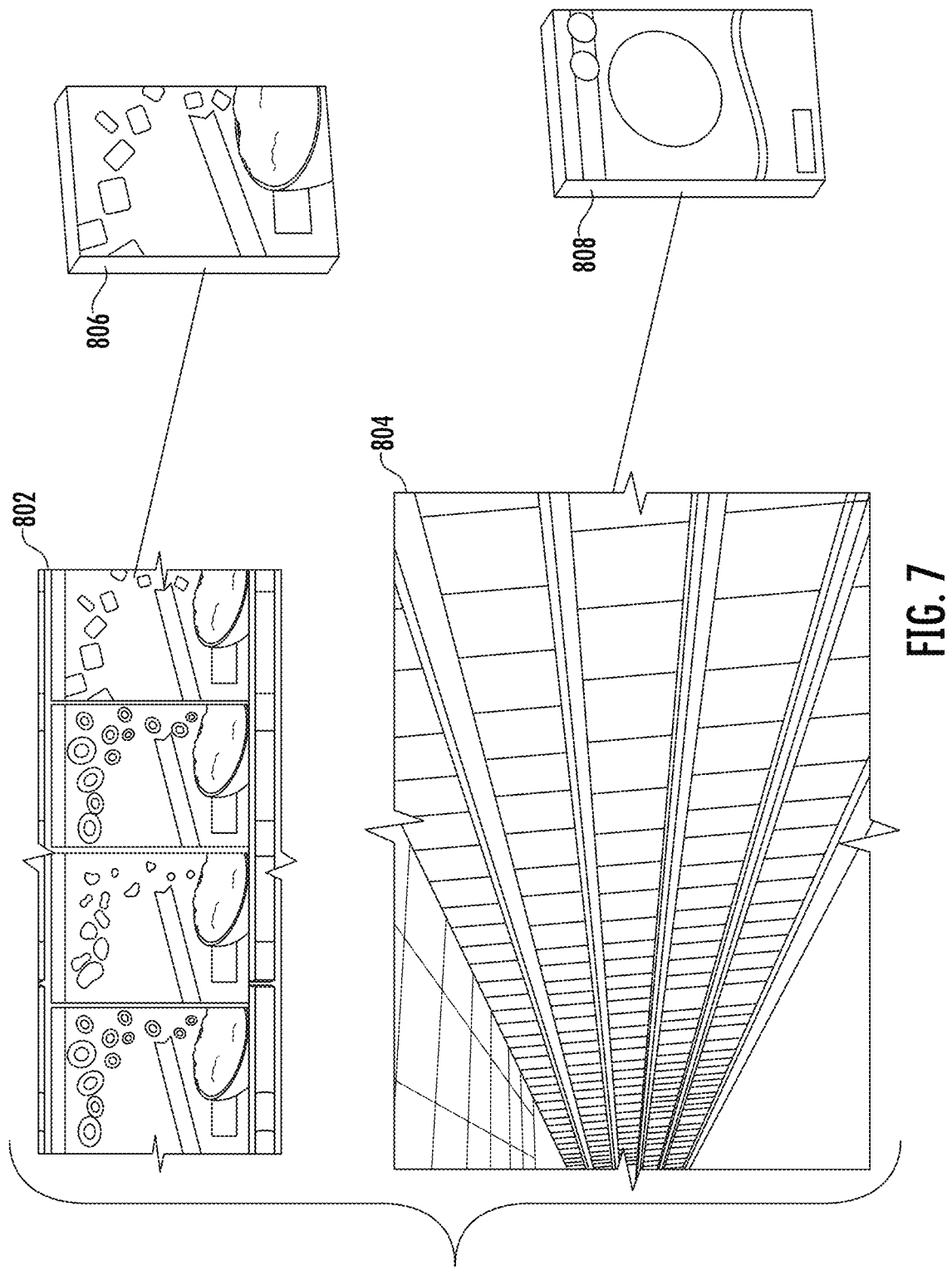
FIG. 7 illustrates a client system with a screen shot of example search results, in accordance with some embodiments.

At 1210, the computing system can provide a user with one or more categorical search results. For example, the computing system can provide the user with the output data 404 which comprise the predicted results based on the output of the visual search result model 202. FIG. 7 illustrates the benefit of the example method described in FIG. 11. Images 802 and 804 are two examples of variants of images that could have the same accompanying textual query (e.g. "which has the highest fiber?"). In response to the two example images 802 and 804 the visual search system would return two different results despite the same accompanying textual query. User interface 806 illustrates that in response to the image 802, based on the compositional characteristics (e.g. the cereal boxes are centered in focus, the cereal boxes are at approximately 90 degree angles meaning they are not askew, all cereal boxes contained in the image are clearly identifiable), the visual search system could return an image of the cereal amongst those identified in the image that has the highest fiber content. In contrast, user interface 808 illustrates that in response to the image 804, based on the compositional characteristics (e.g., the image is taken such that the whole aisle is in view, the cereal boxes are not all in focus, the cereal boxes are at a 30 degree angle meaning more askew), the visual search system could return an image of the cereal amongst all cereals that has the highest fiber content.

Figure 12:
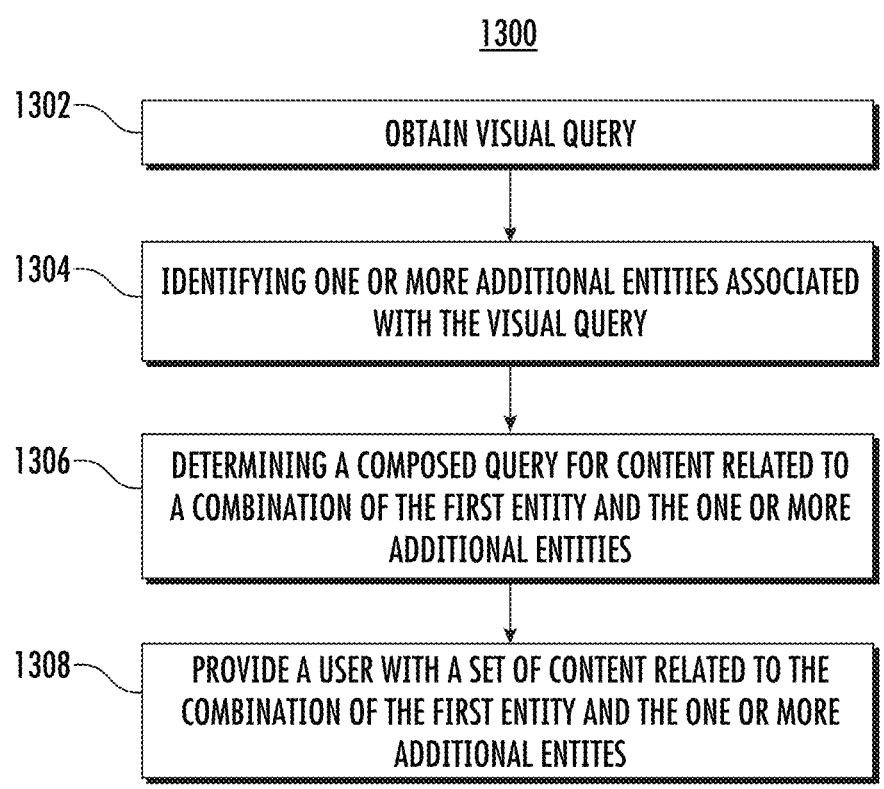
FIG. 12 depicts a flow chart diagram of an example method to perform a more personalized and/or intelligent visual search via combining multiple objects of interest into a search query according to example embodiments of the present disclosure.

FIG. 12 depicts a flow chart diagram of an example method 1300 according to example embodiments of the present disclosure. Although FIG. 12 depicts steps performed in a particular order for purposes of illustration and discussion, the methods of the present disclosure are not limited to the particularly illustrated order or arrangement. The various steps of the method 1300 can be omitted, rearranged, combined, and/or adapted in various ways without deviating from the scope of the present disclosure.

At 1302, a computing system can obtain a visual query. For example, a computing system (e.g., user computing device 102 and visual search system 104 in FIG. 1) can obtain a visual query input data 204 from a user.

At 1304, the computing system can identify one or more additional entities associated with the visual query. In particular, the computer visual search system can identify, based on one or more contextual signals or information, one or more entities associated with the visual search query.

More particularly, the computing system can input the previously obtained visual query into a query processing system. For example, the computing system can input the visual query input data 204 into the query processing system 202. Prior to inputting the visual query, the computing system can access an edge detection algorithm. More specifically, the image acquired may be filtered with an edge detection algorithm (e.g., gradient filter), thereby obtaining a resulting image, which represent a binary matrix which may be measured in a horizontal and vertical direction determining position of objects contained in the image within the matrix.

At 1306, the computing system can determine a composed query for content related to a combination of the first entity and the one or more additional entities. More particularly, the query processing system 202 can leverage the multiple entities to determine a composed query for content related to a combination of the first entity and the one or more additional entities. Specifically, an entity can include people, objects, and/or abstract entities such as events.

At 1308, the computing system can provide a user with a set of content related to the combination of the first entity and the one or more additional entities. For example, the computing system can provide the user with the output data 404 which comprise the predicted results based on the output of the visual search result model 202.

Figure 8:
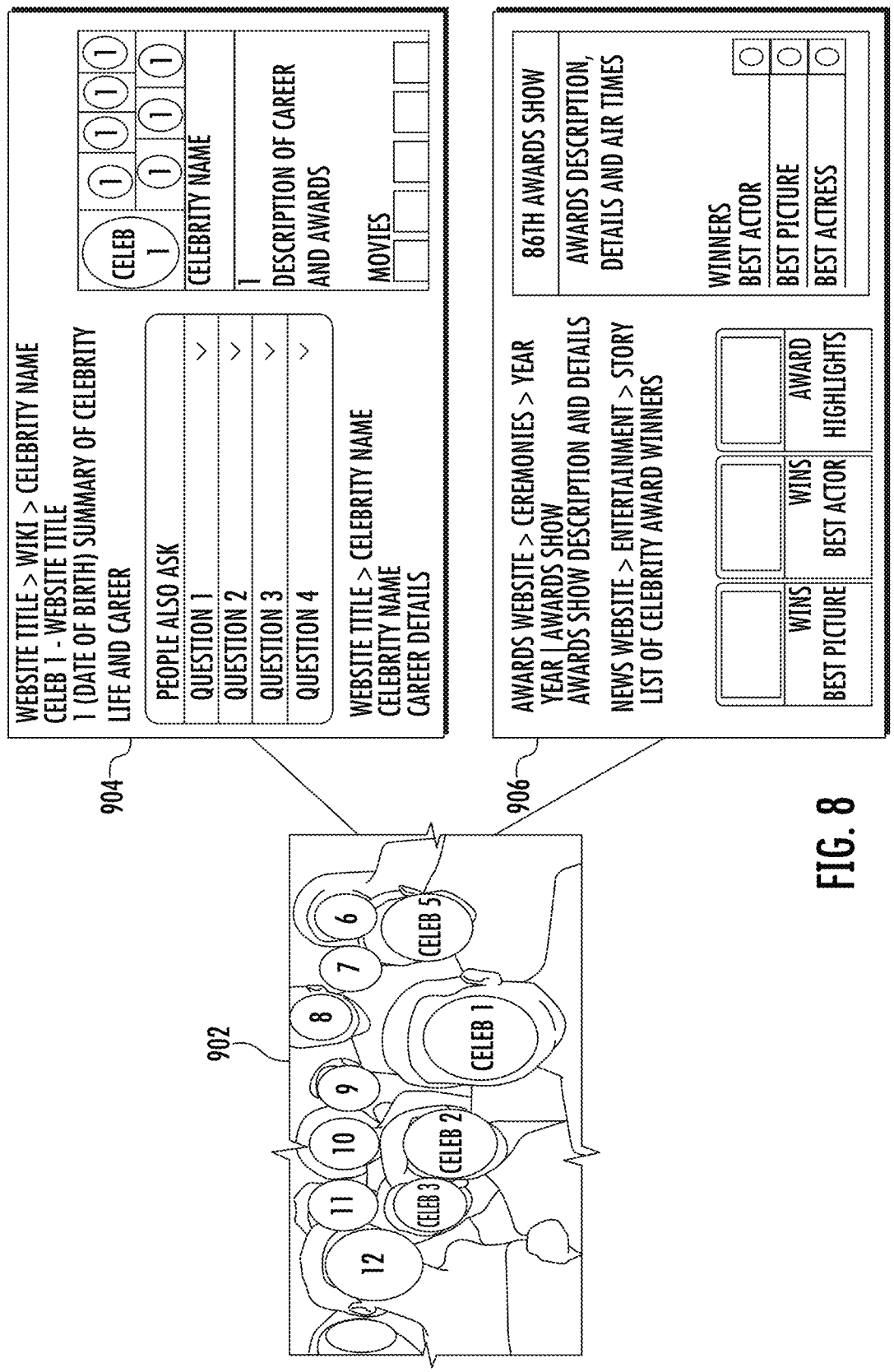
FIG. 8 illustrates a client system with a screen shot of example search results according to multiple objects of interest to illustrate differences, in accordance with some embodiments.

FIG. 8 illustrates the benefit of the example method described in FIG. 12. User interface 904 shows example search results without using the method described in FIG. 12 based on an example visual query 902. User interface 904 illustrates that without the method described in FIG. 12, the search results include results that are only related to individual objects recognized in the visual query image due to the current technology not being capable of composing queries of multiple entities given a visual query. In contrast, User interface 906 shows example search results based on the same example visual query 902 using the method described in FIG. 12. The method takes into account all the faces identified in the visual query and composes a query containing some or all of them or events related thereto, leading to a search result of a specific awards show which was the primary preliminary search result including all the faces identified. 906 illustrates that with the method described in FIG. 12, the search results are expanded and can take into account multiple objects of interest based on compositional characteristics.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for returning a combined set of content responsive to a visual search query, the method comprising:
   obtaining the visual search query, wherein the visual search query comprises an image that depicts an object;
   obtaining, based on a user associated with the visual search query, a user-centric visual interest graph that describes a plurality of different items, wherein a respective set of content is associated with each of the plurality of different items and wherein the user-centric visual interest graph comprises a hierarchical representation of the plurality of different items;

selecting, based on the visual search query, a plurality of selected items from the user-centric visual interest graph for the object depicted by the image, wherein the selecting comprises:

identifying, based on the visual search query, a primary item in the user-centric visual interest graph that corresponds to the object depicted in the image;

identifying one or more additional items in the user-centric visual interest graph that are related to the primary item within the hierarchical representation of the user-centric visual interest graph; and selecting the primary item and the one or more additional items as the plurality of selected items;

in response to the visual search query, returning a combined set of content as search results, wherein the combined set of content comprises at least a portion of the respective set of content associated with each of the plurality of selected items.

2. The method of claim 1, wherein the set of content associated with each of the plurality of different items comprises user-generated content.

3. The method of claim 2, wherein the user-generated content comprises product reviews generated by users.

4. The method of claim 1, wherein the user-centric visual interest graph that describes the plurality of different items comprises a hierarchical representation of the plurality of different items.

5. The method of claim 1, wherein the user-centric visual interest graph that describes the plurality of different items comprises a plurality of nodes that correspond to a plurality of indexed images, wherein the plurality of nodes are arranged within the user-centric visual interest graph based at least in part on visual similarity among the indexed images such that a distance between a pair of nodes within the user-centric visual interest graph is inversely related to visual similarity between a corresponding pair of indexed images.

6. The method of claim 5, wherein:
the plurality of nodes of the user-centric visual interest graph are arranged into a plurality of clusters; and
selecting, based on the visual search query, the plurality of selected items from the user-centric visual interest graph comprises:
performing an edge threshold algorithm to identify a primary cluster of the plurality of clusters; and
selecting the nodes included in the primary cluster as the plurality of selected items.

7. The method of claim 5, wherein selecting, based on the visual search query, the plurality of selected items from the user-centric visual interest graph comprises:
performing an edge threshold algorithm to identify a plurality of visually similar nodes that are visually similar to the object depicted by the image; and
selecting the visually similar nodes as the plurality of selected items.

8. The method of claim 1, wherein each of the identified sets of content differs in degree of specificity.

9. The method of claim 2, further comprising:
semantically analyzing words included in the user-generated content to determine a level of visual descriptiveness for the user-generated content;
wherein returning the combined set of content as search results comprises determining, for at least one of the plurality of selected items, whether to include the user-generated content in the combined set of content based at least on its determined level of visual descriptiveness.

10. The method of claim 1, further comprising:
accessing user-specific user interest data associated with a user and descriptive of visual interests of the user;
wherein selecting, based on the visual search query, a plurality of selected items from the graph comprises selecting, based on the visual search query and further based on the user-specific user interest data, a plurality of selected items from the user-centric visual interest graph.

11. A computing system for returning a combined set of content responsive to a visual search query, the system comprising:
one or more processors; and
one or more non-transitory computer-readable media that collectively store instructions that, when executed by the one or more processors, cause the computing system to perform operations, the operations comprising:
obtaining the visual search query, wherein the visual search query comprises an image that depicts an object;
obtaining, based on a user associated with the visual search query, a user-centric visual interest graph that describes a plurality of different items, wherein a respective set of content is associated with each of the plurality of different items and wherein the user-centric visual interest graph comprises a hierarchical representation of the plurality of different items;
selecting, based on the visual search query, a plurality of selected items from the user-centric visual interest graph for the object depicted by the image, wherein the selecting comprises:
identifying, based on the visual search query, a primary item in the user-centric visual interest graph that corresponds to the object depicted in the image;
identifying one or more additional items in the user-centric visual interest graph that are related to the primary item within the hierarchical representation of the user-centric visual interest graph; and
selecting the primary item and the one or more additional items as the plurality of selected items;
in response to the visual search query, returning a combined set of content as search results, wherein the combined set of content comprises at least a portion of the respective set of content associated with each of the plurality of selected items.

12. The system of claim 11, wherein the operations further comprise:
processing the image with a machine-learned object detection model to detect the object.

13. The system of claim 12, wherein the machine-learned object detection model comprises a coarse classifier that determines whether the image includes an object in one or more particular classes of objects.

14. The system of claim 13, wherein the coarse classifier determines whether the image includes the object in the one or more particular classes of objects based on detecting one or more features that are indicative of the one or more particular class of objects.

15. The system of claim 11, wherein the operations further comprise:
performing optical character recognition on the image to recognize text within the image.

16. The system of claim 15, wherein the primary item is determined based on the object depicted in the image and the text within the image.

17. One or more non-transitory computer-readable media that collectively store instructions that, when executed by one or more computing devices, cause the one or more computing devices to perform operations, the operations comprising:
obtaining a visual search query, wherein the visual search query comprises an image that depicts an object;
obtaining, based on a user associated with the visual search query, a user-centric visual interest graph that describes a plurality of different items, wherein a respective set of content is associated with each of the plurality of different items and wherein the user-centric visual interest graph comprises a hierarchical representation of the plurality of different items;
selecting, based on the visual search query, a plurality of selected items from the user-centric visual interest graph for the object depicted by the image, wherein the selecting comprises:
identifying, based on the visual search query, a primary item in the user-centric visual interest graph that corresponds to the object depicted in the image;
identifying one or more additional items in the user-centric visual interest graph that are related to the primary item within the hierarchical representation of the user-centric visual interest graph; and
selecting the primary item and the one or more additional items as the plurality of selected items;
in response to the visual search query, returning a combined set of content as search results, wherein the combined set of content comprises at least a portion of the respective set of content associated with each of the plurality of selected items.

18. The one or more non-transitory computer-readable media of claim 17, wherein the object comprises a landmark.

19. The one or more non-transitory computer-readable media of claim 17, wherein the object comprises a product.

20. The one or more non-transitory computer-readable media of claim 17, wherein the object comprises an animal.

* * * * *